United States Patent [19]

Scott et al.

[11] 4,409,842

[45] Oct. 18, 1983

[54] STRUCTURAL INFORMATION DETECTOR

[75] Inventors: David R. Scott, Lancaster, Calif.; Thomas S. Rhoades, Colorado Springs, Colo.

[73] Assignee: Scott Science & Technology, Inc., Lancaster, Calif.

[21] Appl. No.: 371,321

[22] Filed: Apr. 26, 1982

Related U.S. Application Data

[63] Continuation-in-part of Ser. No. 265,031, May 18, 1981, abandoned, which is a continuation-in-part of Ser. No. 86,772, Oct. 22, 1979, Pat. No. 4,287,511.

[51] Int. Cl.$^3$ .............................................. G01L 1/24
[52] U.S. Cl. ........................................ 73/800; 356/34
[58] Field of Search ................. 73/763, 765, 786, 800; 364/508; 356/34

[56] References Cited

U.S. PATENT DOCUMENTS

| | | | |
|---|---|---|---|
| 2,796,503 | 6/1957 | Ward | 73/765 X |
| 3,128,375 | 4/1964 | Grimnes | 364/508 |
| 3,354,703 | 11/1967 | Russell, Jr. et al. | 364/508 X |
| 3,412,961 | 11/1968 | Howard | 364/508 X |
| 3,510,696 | 5/1970 | Bargen et al. | 364/508 X |
| 3,755,658 | 8/1973 | Walters | 364/508 |
| 4,263,810 | 4/1981 | Chiu | 73/800 |

Primary Examiner—Jerry W. Myracle
Attorney, Agent, or Firm—William H. Drummond

[57] ABSTRACT

A self-contained, unitary device for collecting and interpreting data reflecting the effect of a force acting on a structure includes a housing adapted to be attached at spaced points to the surface of the structure, an optical sensor within the housing for detecting the relative orientation of spaced surface coordinate vectors of the structure, circuitry within the housing for converting signals from the optical sensor to a form usable by signal-processing electronics also located within the housing. The output of this structural information detector embodies useful information which directly indicates the effect of the force acting on the structure.

4 Claims, 6 Drawing Figures

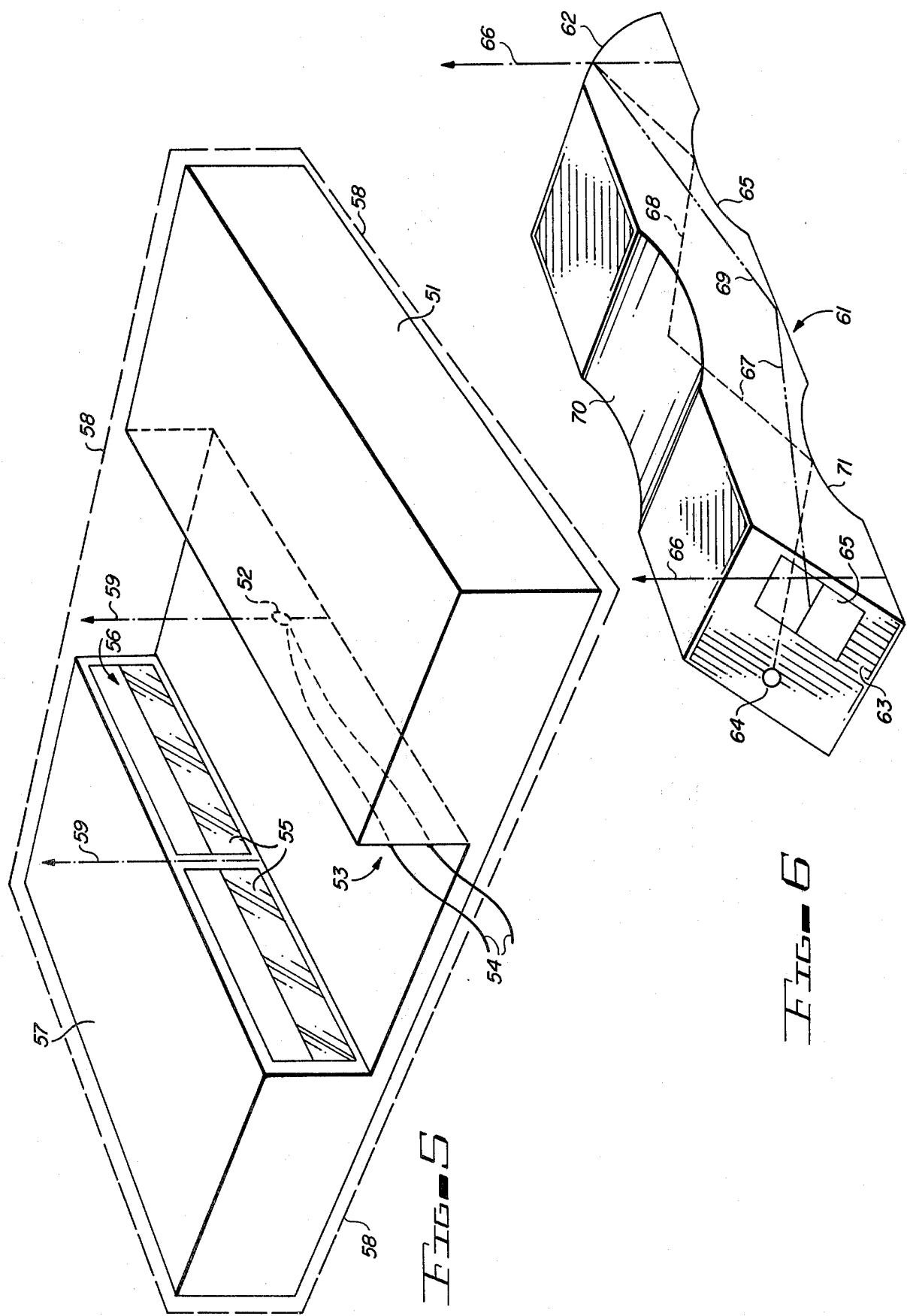

STRUCTURAL INFORMATION DETECTOR

This application is a continuation-in-part of co-pending application Ser. No. 265,031, filed May 18, 1981, now abandoned entitled "System for Assessing the Integrity of Structural Systems (Omnibus)", which is, in turn, a continuation-in-part of co-pending application Ser. No. 86,772, filed Oct. 22, 1979, entitled "Intrusion Alarm System", now issued U.S. Pat. No. 4,287,511, incorporated by reference.

This invention relates to a structural information detector.

More particularly, the invention concerns a structural information detector for collecting and interpreting data reflecting the effect of at least one of a plurality of forces acting on a structure.

In a primary aspect, the invention concerns a unitary device which optically senses the relative orientation of spaced surface coordinate vectors on the surface of a structure, generates primary electrical signals which are merely raw data, converts the raw primary signals to a form usable by signal-processing electronics and provides, as the output of the device, electrical signals which embody useful information which directly indicates the effect of forces acting on the structure.

In yet another respect, the invention pertains to a structural information detector in the form of a unitary device in which the optical system, raw data conversion circuitry and signal-processing electronics are all carried by a single semiconductor substrate.

In still another and further respect, the invention pertains to a novel optical system usable in a structural information detector of the type described.

Optical sensors, commonly called structural moment detectors or flexural rigidity sensors, are known in the art. These devices are basically autocollimators which are insensitive to linear dynamic motion but which respond to angular deflection of one end of the sensor with respect to the other. For example, such sensors are disclosed in the patent to Rossire (U.S. Pat. No. 3,229,511) and in the publication entitled "The Structural Rigidity Sensor: Applications in Non-Destructive Testing", published by the Air Force Systems Command, U.S. Air Force (Frank J. Seiler Research Laboratories Publication SRL-TR-75-0017, October 1975). See also the U.S. patents to Okubo, U.S. Pat. Nos. 4,159,422 issued June 26, 1979, and 4,164,149 issued Aug. 14, 1979.

In our co-pending application Ser. No. 265,031 and in our issued U.S. Pat. No. 4,287,511, we disclose various systems which employ the structural moment detector or flexural rigidity sensor in numerous end-use applications such as, without limiting the generality of the foregoing, basic measurement systems, structural integrity measurement systems, applied structural measurement systems, applied load measurement systems and applied communication-detection systems.

The systems disclosed in our co-pending application and our issued patent employed substantially conventional structural moment detectors, the output of which was simply raw data which did not directly indicate or give useful information concerning the effect of forces acting on a structure to which the sensor was attached. Rather, the raw data from the sensors, according to our co-pending application and our issued patent, was conditioned and processed by external electronics, including microprocessors and computational software, usually necessarily located at locations remote from the sensors, themselves. Since many of the end-use applications of the systems disclosed in our co-pending application and our issued patent necessarily required an array of such sensors located at widely spaced points on the structure under investigation, the sheer complexity of the wiring necessary for the sensors to communicate with the signal-conditioning and data-processing equipment imposed significant cost and technical limitations on the utility of such systems. Additionally, as disclosed in our co-pending application and in our issued patent, the sensors employed were of conventional size, i.e., upwards of several inches in the major dimension thereof, which, in turn, limited the applications of the systems disclosed in those instances in which the sensors are required to be installed in confined spaces.

Also, the cost of manufacturing such conventional flexural rigidity sensors and the time and cost of installing them was increased, owing to the fact that they were essentially two-piece devices, each separate piece containing portions of the optical sensing system. In the manufacture and installation of such two-piece devices, much time and expense was encountered in optically aligning the two pieces of the device so as to achieve the desired end result. Additionally, the size and structural features of such prior art flexural rigidity sensors contributed significantly to subsidiary problems such as maintenance and/or replacement thereof, temperature sensitivity, etc.

It would, therefore, be highly advantageous to provide a device (herein termed the "structural information detector") in which the raw signal from the optical sensor is converted and processed within a unitary device (either a single-piece device or a multi-component device in which each of the components is assembled to form an integral unit) such that the electrical signal output of the device has a directly useful information content which can be displayed or recorded by any conventional means or which can be directly utilized to activate control systems, obviating the need for complicated wiring and, in most cases, any external data-processing hardware and/or software. It will be understood by those skilled in the art that there may be instances in which various individual structural information detectors in an array may be required to communicate with each other, as well as with central display, recording or control hardware and/or software, but even in those instances, the complexity of the interconnecting wiring is significantly reduced in comparison with systems employing conventional flexural rigidity sensors having external signal conversion and data-processing hardware and/or software.

It would also be highly advantageous to provide such a unitary integrated structural information detector of greatly reduced size and complexity of manufacture, installation, maintenance and replacement, and having improved subsidiary characteristics such as temperature sensitivity, etc.

Therefore, the principal object of the present invention is to provide a unitary structural information detector which is either a single-piece device or in which the components are mechanically integrated to form a unitary device.

Another principal object of the invention is to provide such a structural information detector which directly provides, as the output thereof, an electrical signal having an information content which is directly usable by conventional data display and/or recording systems or by various control devices such as servomotors, microswitches, etc.

Yet another object of the invention is to provide an improved optical system which may be utilized in the structural information detector herein disclosed as well as in conventional flexural rigidity sensors.

Yet another object of the invention is to provide a structural information detector which, when mounted on any particular structure or sub-component thereof, will directly provide information on any one or all of the performance characteristics of the structure such as, but not limited to, the ability of the structure to carry loads, the loads on the structure, the existence of cracks within the structure, the detection of cracks as they occur within the structure, the effect of cracks on the ability of the structure to carry a load, the resonant or natural frequencies of the structure, the changes in the natural frequencies of the structure, the vibration levels existing within the structure, the response of the structure to natural or induced forces, the distribution of the stiffness of the structure for each of the natural frequencies and other data related to the integrity or condition of the structure upon which the structural information detector is mounted.

These and other, further and more specific objects and advantages of the invention will become apparent to those skilled in the art from the following detailed description thereof, taken in conjunction with the drawings, in which:

FIG. 5 is a perspective view of a structural information detector according to another embodiment of the invention, in which the components are carried by a semiconductor substrate; and FIG. 6 is a perspective view of a novel optical system usable in the structural information detector of FIG. 2, as well as in the structural moment detectors or flexural rigidity sensors of the prior art.

Figure 1:
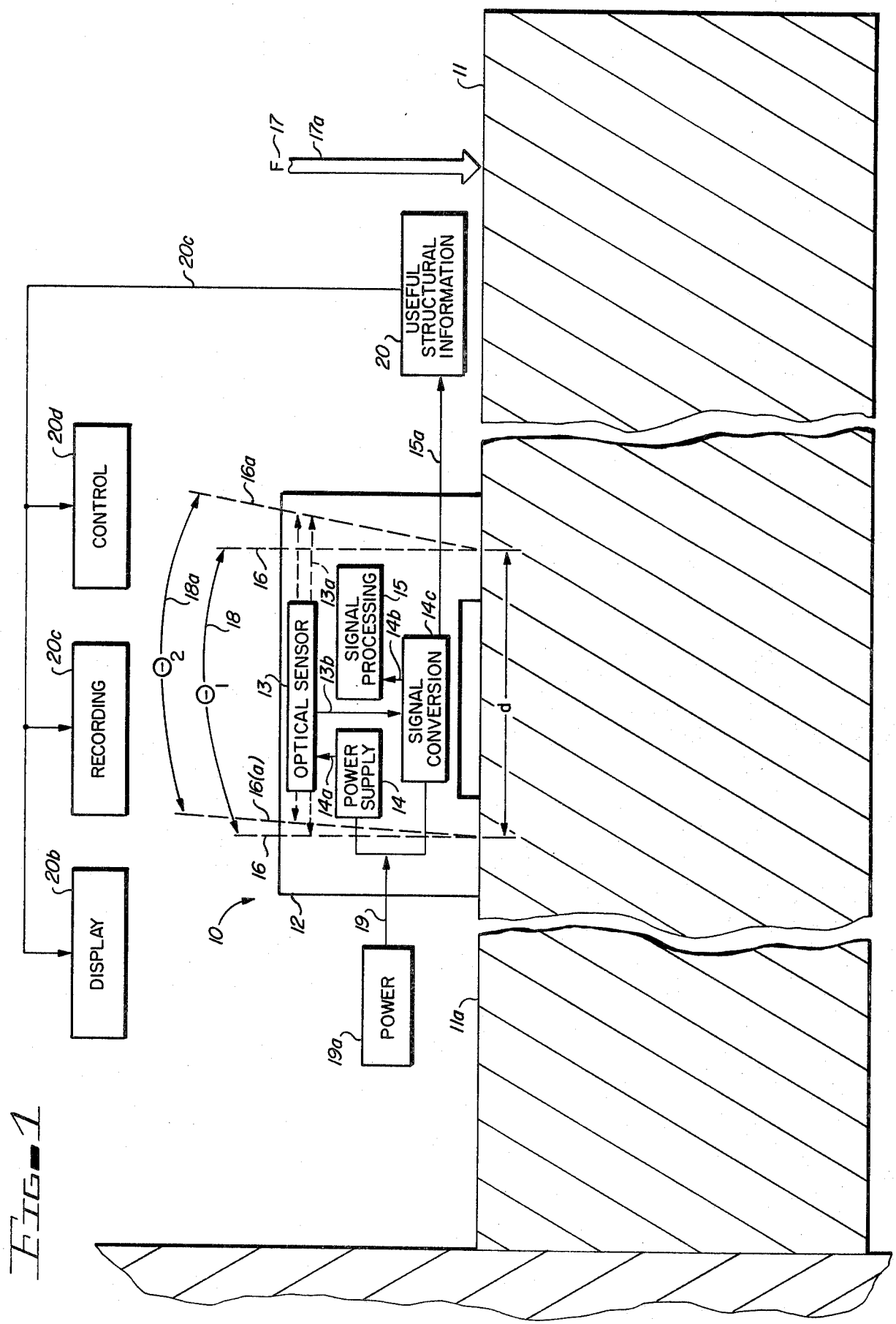
FIG. 1 is a generalized block diagram illustrating the major sub-components of the structural information detector of the present invention.

Briefly, in accordance with our invention, we provide a structural information detector for collecting and interpreting data reflecting the effect of at least one of a plurality of forces acting on a structure. The structural information detector includes a housing adapted to be attached to the surface of a structure, optical means within the housing for detecting the relative orientation of spaced surface coordinate vectors of the structure and for generating primary signals in response to changes in the orientation thereof, circuit means within the housing for converting the primary signals to a form usable by signal-processing electronics, and data-processing electronics within the housing including computational software, for processing the converted primary signals to secondary signals. The secondary signals embody useful information which directly indicates the effect of at least one of the plurality of forces acting on the structure.

In one embodiment of the invention, the optical sensor, the signal converting circuit and the data-processing electronics are carried by a single-piece semiconductor substrate received within the housing.

In another embodiment of the invention, the housing comprises first and second housing sub-assemblies. The first housing sub-assembly contains the signal-converting circuit, the signal and data-processing electronics and those components of the optical sensor which include the light source, the photovoltaic detectors and the collimating lens. The light source and the photovoltaic detectors are carried on the inner face of a hollow barrel portion formed in the first housing sub-assembly and the collimating lens is carried proximate the open end of the barrel portion. The second housing sub-assembly contains, as another component of the optical sensor, a plane surface mirror carried on the inner end of a mating barrel portion formed therein. The mating barrel portion is shaped and dimensioned to receive the barrel portion formed in the first housing sub-assembly with an interference fit therebetween to form a unitary structurally integrated device. Means are provided for mounting the first and second housing sub-assemblies at spaced points on a structure.

According to yet another embodiment of the invention, we provide, as a sub-components, an optical sensor adapted for use in the structural information detector and which is also usable in flexural rigidity sensors and structural moment detectors of the prior art. According to this embodiment of the invention, the sensor includes an elongate light transmission member formed of a light-transmitting flexible material and having a light-transmitting/receiving end and a reflecting end. A concentrating lens is formed in the reflecting end of the light-transmission member. The light-transmitting/receiving end of the member carries a light source positioned to direct light through the member toward the concentrating lens formed in the other end of the member. The light-transmitting/receiving end also carries light receiving means for receiving the light transmitted through the member from the light source to the concentrating lens and reflected thereby through the member to the light-receiving means. The light-receiving means generate electrical signals in response to the received light. Means are provided for interconnecting the ends of the light-transmitting member to spaced points on a structure such that bending of the structure causes corresponding bending of the light-transmission member and, in turn, causes a variation in the amount of light received by the light-receiving means.

As used herein, the term "structure" will be understood to include, as the context may indicate, an overall structure resulting from the assembly of sub-components or, as the context may indicate, one or more of the sub-components themselves. The term is also intended to include naturally occurring, as well as man-made, structures and, for example, may even include a living organism such as the human body.

The term "surface" as used herein is intended to mean and include not only the exterior surface of a structure but also any natural or artificial internal surface thereof including, without limiting the generality thereof, planes passing through an axis of the structure.

The term "surface coordinate vector" as used herein is intended to mean both the normal and the tangent to the surface of a structure and any angle therebetween.

Turning now to the drawings, in which the presently preferred embodiments of the invention are depicted for purposes of illustrating the practice thereof to a person skilled in this art and which are not intended as an indication of the limitations on the scope thereof, FIG. 1 is a block diagram which illustrates the major sub-components of the structural information detector of the present invention and their cooperative interrelationships. The structural information detector, generally indicated by the reference numeral 10, is depicted for purposes of illustration as being mounted upon a simple cantilevered beam 11 and consists of a housing 12, an optical sensor 13, sensor power supply 14, raw signal conversion circuitry 14c and signal-processing electronics, including a microprocessor and appropriate software, 15. The optical sensor 13, preferably a structural moment detector of the type generally disclosed in our issued patent, U.S. Pat. No. 4,287,511, and in our co-pending application, Ser. No. 265,031, (sometimes also known as a "flexural rigidity sensor") measures, as indicated by the dashed line 13a, the relative orientation of surface coordinate vectors which are, as illustratively depicted in FIG. 1, normals 16 to the surface 11a of the beam 11. If a force F (17) is applied in the direction of the arrow 17a to the beam 11, resultant bending of the beam 11 will cause a change in the relative orientation of the surface coordinate vectors 16 to the positions indicated by the dashed lines 16a, i.e., from the angular orientation 18 $\theta$1 (shown in FIG. 1, illustratively, as 180°) to an angular orientation 18a $\theta$2 which (as illustratively depicted in FIG. 1) is greater than $\theta$1. Power 19 from an external power source 19a is supplied to the circuitry 14 which, as explained below, provides a regulated power supply 14a to the optical sensor 13. The raw data 13b from the optical sensor 13, which could be a variable voltage or a variable current, is supplied to the raw signal conversion portion of the circuitry 14, which converts the raw data, as will be further explained below, to a form which is the input 14b to the signal and data-processing electronics and software 15, which processes the converted signal 14b and provides, as the output 15a of the structural moment detector 10, a signal which embodies useful structural information 20 which directly indicates the effect of the force F acting on the beam 11. As indicated by the line 20a, the useful structural information 20 can be utilized in any or all of a variety of ways, i.e., it can be used as the input to a direct display 20b which may be a simple galvanometric meter, liquid crystal display, light emitting diode display, cathode ray tube or the like. Also or alternatively, the useful structural information 20 can be used as the input to a semi-permanent or permanent recording device 20c, such as paper recorders, magnetic recorders, semiconductor storage devices, bubble memory storage devices, or holographic storage devices. Also or alternatively, the useful structural information 20 can form the input to various control devices 20d such as servomotors and other similar electromechanical devices.

As will be appreciated by those skilled in the art, and as indicated in our issued patent and co-pending application, it may be necessary or desirable in certain end-use applications to employ an array of structural information detectors of the type generally illustrated in FIG. 1, in which case it may be necessary or desirable to provide communication paths between some or all of the individual structural information detectors in the array and/or with suitable central data display, recording and/or control components, as well as with additional hardware and software which correlate the useful structural information outputs of the individual structural moment detectors in the array. These details have been omitted for the purpose of clarity as the present invention is directed to the individual structural information detectors whose only input is an external power source and whose single output is directly useful structural information.

Figure 2:
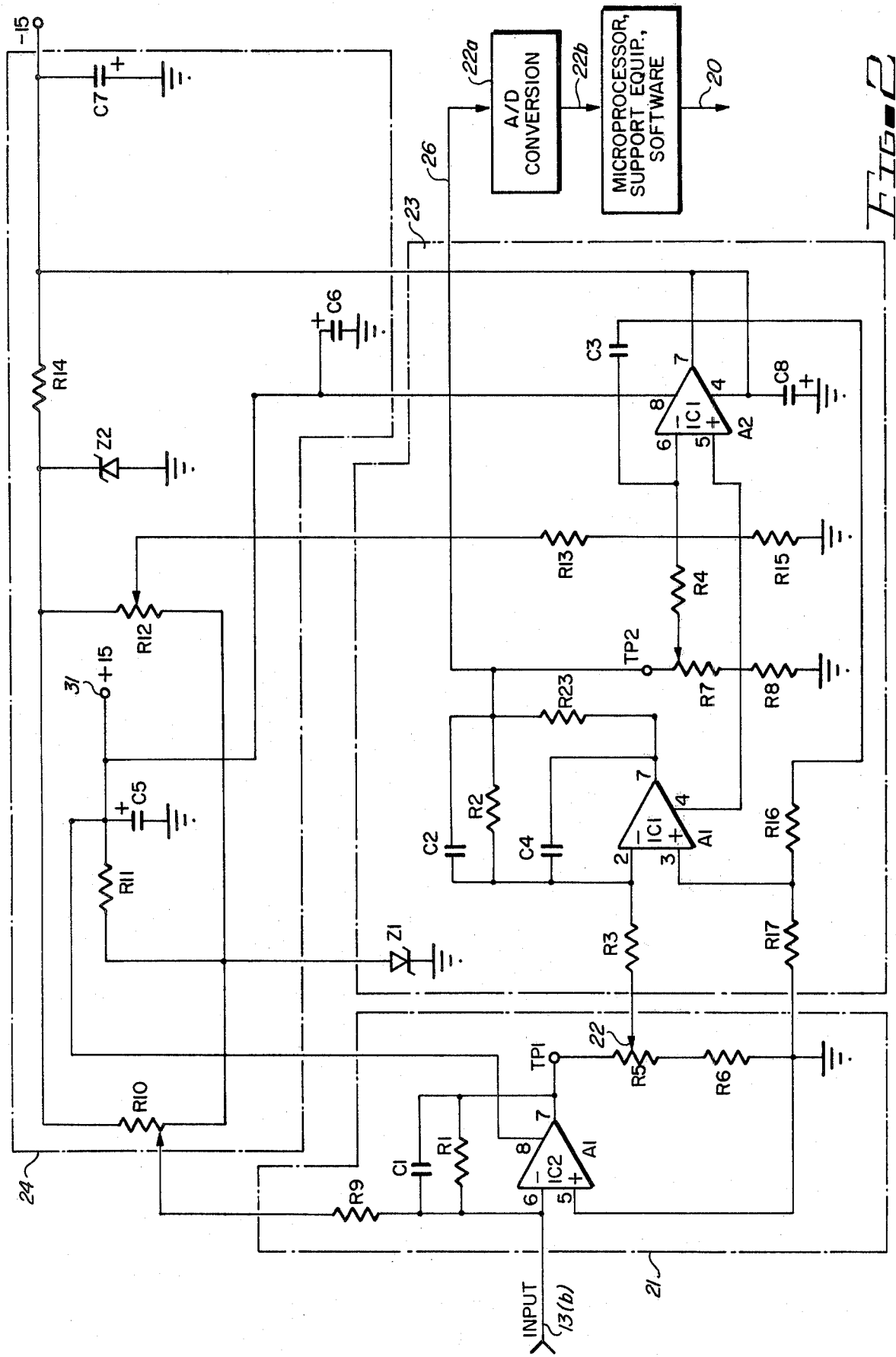
FIG. 2 is a circuit schematic depicting an analog circuit which functions to electrically interface the optical detector of the structural information detector with signal-processing electronics and perform the data processing functions according to the presently preferred embodiment of the invention.

In the presently preferred embodiment of the invention, the raw data output 13b of the optical sensor 13 (referring to FIG. 1) is (referring to FIG. 2) the input to the signal-processing electronics, including computational software therein depicted. The function of the circuitry depicted in FIG. 2 is to convert the raw data input 13b from the optical sensor into data suitable for electronic data processing and then to perform the data-processing function to yield a signal, the components of which directly provide useful structural information. According to the presently preferred embodiment of the invention, the conversion is performed with analog electronics, rather than digital. The analog electronics perform two distinct functions. First, the output signal 13b from the optical sensor is measured and converted to a proportional voltage in a voltage follower circuit which, for clarity of illustration, are those components which are located within the dashed line 21. The second function is to amplify the proportional voltage signal from the voltage follower circuit 21 by feeding it through a gain control 22 into an amplifier which, for purposes of clarity of description, are those components located within the dashed line 23. The voltage follower circuit 21 operates as a short circuit load for the photovoltaic cells of the optical sensor. Feedback is added in the amplifier circuit 23 to shape the upper end of the frequency response so that spurious high frequency noise is attenuated. This function is performed by applying the output of IC1 (pin 7) to the input (pin 6) of IC2 through a voltage divider formed by R7-R8. IC2 acts as a low-pass filter. The output of IC2 (pin 7) is fed back through R16 to the input 3 of IC1 to act as an automatic bias adjustment. An offset voltage adjustment is provided to remove any bias due to photocell mismatch.

The gain control 22 provides a means of balancing the mechanical gain of different sensors and compensating for components variation. The nominal adjustment range is ±15%. The amplifier 23 is a high gain direct-coupled amplifier with feedback to further attenuate high frequency noise levels. Nominal gain is 1.5 volts/microamp and the bandwidth is normally initially set at 50–500 Hz. In essence, A2 is a variable cut-off low-pass filter. If the DC case is considered, its output will seek a level such that the voltage presented to pin 3 of A1 is equal to that presented to pin 2 by the voltage follower circuit. The scaling of the system is such that $$U_{null} = V_{int}(R17/R16 + R17) = V_{in}$$

where $V_{int}$ is the integrator output, $V_{in}$ is the first stage output and $U_{null}$ is the input to A1, pin 2. Thus, for low frequency, $V_{int}$ represents a scaled value equal to or greater than $V_{in}$ independent of the gain in the second stage of the amplifier. The implication of this is that the gain of the second stage can be set very high for frequencies above the autonull roll-off without completely losing DC information.

Support and bias circuits which include the components which are, for clarity of illustration, enclosed within the dashed line 24 are provided to provide conditioned power and bias voltages for the components of the voltage follower 21 and amplifier 23.

The output 26 of the amplifier 23 is an analog signal which is converted to a digital signal in the A-D converter 22a. A non-limiting, illustrative, example of a suitable analog-digital converter is manufactured by Analog Devices, No. HAS1202.

Finally, the signal-processing electronics also includes a microprocessor 25 and appropriate computational software which converts the output signal 22b of the A-D converter 22a into electrical signals 20 which directly provide data related to the effect of the force acting on the structure to which the structural information detector is attached. In the presently preferred embodiment, this component includes a microprocessor, the necessary supporting devices and a power supply, details of which are omitted for purposes of clarity because they are well-known to those skilled in the art. Suitable non-limiting examples of microprocessors which can be employed are the TI9000 or the Intel 8086.

Figure 3:
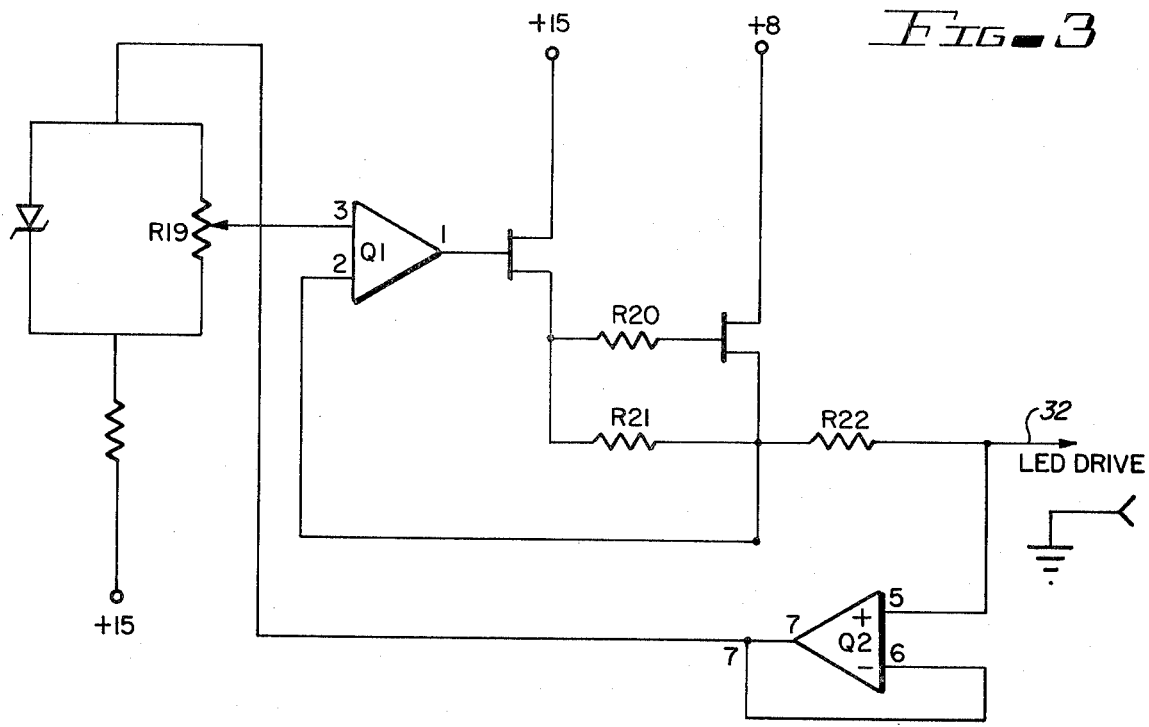
FIG. 3 is a circuit schematic depicting the current source circuit for the light emitting diodes of the optical sensor portion of the structural information detector, in accordance with the presently preferred embodiment of the invention.

All of the elements described in FIGS. 2 and 3 may be fabricated on a printed circuit board using standard integrated circuits or on a single thick film substrate where the circuits have been wire bonded to the substrate. In the embodiment of the invention described in connection with FIG. 5, these components may be made as a single integrated circuit on the same semiconductor substrate chip used in fabricating the optical sensor.

According to the presently preferred embodiment of the invention, yet another function of the signal-processing electronics is to provide a precise current to the light emitting diode of the optical sensor.

Typical non-limiting, illustrative, values of the components of FIG. 2 are set forth below:

Voltage Follower/Amplifier

R1—220K
R5—1K
R6—2.2K
R9—2.2 M
R23—82
A1—Operational Amplifier LF353/2

Second Stage Amplifier

R2—680K
R3—10K
R4—1 M
R7100K
R8—10K
R13—2.2 M
R15—220K
R16—10K
R17—1K
C2—47 PF
C3—10 MF
Cr—5 PF
A1—Operational Amplifier LF353/2
A2—Operational Amplifier LF353/2

Support and Bias Circuits

R10—100K
R11—1.8K
R12—100K
R14—1.8K
C5—10 MF
C6—10 MF
C7—10 MF
C8—10 MF
Z1—LM336
Z2—LM336

For sake of clarity, this circuitry has been separated from the circuitry of FIG. 2 and is shown schematically in FIG. 3. The 15 volt power supply 31 is provided by the support and bias circuitry 24 of FIG. 2.

The power supply circuitry of FIG. 3 utilizes two amplifiers in a high gain feedback arrangement to provide the necessary precise current 32 to the light emitting diode.

Typical non-limiting, illustrative, values of the components of FIG. 3 are set forth below:

Power Supply

R18—3.3K
R19—10K
R20—10K
R21—10K
R22—47
C9—10 MF
C10—10 MF
IC3—Operational Amplifier LF353/2
Q1—2N5457
Q2—TIP21

Figure 4:
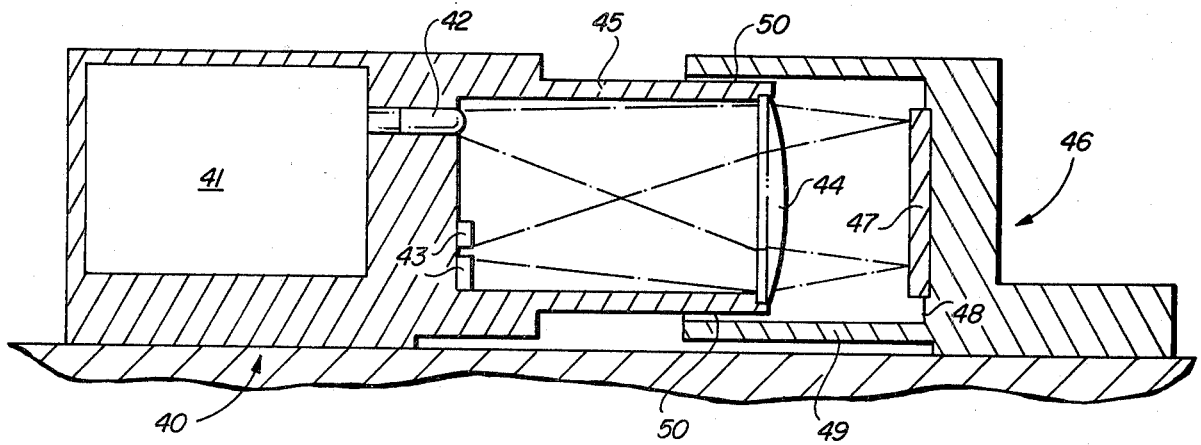
FIG. 4 is a sectional view of a structural information detector according to one embodiment of the invention.

FIG. 4 is a sectional view illustrating a structural information detector constructed in accordance with one of the preferred embodiments of the invention and consists of a first housing sub-assembly generally indicated by reference character 40 containing the sensor power supply/ray signal conversion/signal-processing electronics 41 of FIGS. 2-3, a light emitting diode 42, a pair of photovoltaic detectors 43 and a collimating lens 44 carried proximate the open end of a barrel portion 45 formed in the housing 40. A second housing sub-assembly, generally indicated by reference numeral 46, carries a plane surface mirror 47 on the inner end 48 of a mating barrel portion 49 formed in the housing sub-assembly 46. Although a substantial clearance 50 is shown between the barrel portion 45 formed in the first housing sub-assembly 40 and the barrel portion 49 formed in the second housing sub-assembly 46, it will be understood by those skilled in the art that this clearance is shown only for the purpose of clarifying the mechanical relationship of the two housing sub-assemblies 40 and 46. In actuality, the mating barrel portion 49 formed in the second housing sub-assembly 46 is shaped and dimensioned to receive the barrel portion 45 formed in the first housing sub-assembly 40 with an interference fit therebetween, to form a unitary structurally integrated device which excludes ambient light from the interior of the barrel portions 45 and 49 and which facilitates and assists in maintaining precise optical alignment of the two sub-assemblies.

Structural information detectors of the type depicted in FIG. 4 have been successfully manufactured, tested and used which are in the size range of as small as one inch in the major dimension. Present work indicates that, eventually, this can be reduced to ¼-150 " in the major dimension.

FIG. 5 illustrates yet another presently preferred embodiment of the invention in which all of the components of the structural information detector are carried by any suitable semiconductor substrate, such as a silicon chip 51. The generally U-shaped chip 51 carries the light emitting diode 52 on an inner face 53 of one of the legs of the U-shaped chip and leads 54 for providing power to the light emitting diode. A pair of photovoltaic cells 55 are grown by known semiconductor manufacturing techniques on the inner face 56 of the opposing leg of the U-shaped chip 51. Bending of the chip 51 induced by bending of a structural member to which it is attached by any suitable technique, such as epoxy bonding, causes a variation in the light falling on the photocells 55, depending on the relative orientation of surface coordinate vectors (normals) 56. The circuitry of FIGS. 2-3 is formed by known semiconductor manufacturing techniques in the portion 57 of the silicon chip 51. The entire chip is then received within a suitable housing indicated by the dashed lines 58 to protect the internal components from adverse ambient environmental effects and to prevent stray light from interfering with the operation of the optical components 52 and 55. As in the case of the embodiment of FIG. 4, devices such as those depicted in FIG. 5 can be manufactured in a size range as small as ¼-⅛" in the major dimension.

According to yet another presently preferred embodiment of the invention, as depicted in FIG. 6, the components of the optical sensor 10 (FIG. 1) can be carried by an elongate light transmission member, generally indicated by reference character 61, formed of a light-transmitting flexible material such as, for example, methacrylate polymers and copolymers known in the art. A concentrating lens 62 is formed in one end of the light-transmission member 61 and the other end 63 carries a light source 64 such as a LED and a pair of photocells 65 which generate electrical signals indicating the relative orientation of surface vector coordinates (normals) 66 to the surface of a structural member upon which the structural information detector is mounted. If desired, the length of the light-transmission path 67 can be lengthened by cutting or forming facets 68 in the external surfaces of the elongate light-transmitting member which will reflect light beams 68 transmitted from the LED to the concentrating lens 62 and which are then reflected 69 to the photocells 65. The entire optics system illustrated in FIG. 6, along with the sensor power supply/raw signal conversion/signal-processing electronics components of the structural information detector of FIG. 1, are then enclosed in a suitable housing to protect the optics and electronics components from adverse ambient conditions and from interference caused by stray light. The housing is omitted in FIG. 6 for purposes of clarity.

Having described our invention in such terms as to enable those skilled in the art to understand and practice it, we claim:

1. A structural information detector for collecting and interpreting data reflecting the effect of at least one of a plurality of forces acting on a structure, said structural information detector comprising, in combination:
   (a) a housing adapted to be attached to the surface of said structure;
   (b) optical means within said housing for
      (i) detecting the relative orientation of spaced surface coordinate vectors of said structure, and
      (ii) generating primary signals in response to changes in said orientation;
   (c) circuit means within said housing for converting said primary signals to a form usable by signal-processing electronics; and
   (d) signal-processing electronics means within said housing, including computational software, for processing said converted primary signals to secondary signals, which embody useful information which directly indicates the effect of at least one of a plurality of forces acting on said structure.

2. Structural information detector of claim 1, in which said optical means, said circuit means and said signal-processing electronics means are carried by a single-piece semiconductor substrate received within said housing.

3. Structural information detector of claim 1, in which said housing comprises first and second housing sub-assemblies:
   (a) said first housing sub-assembly containing said circuit means, said signal-processing electronics means and those components of said optical means which include
      (i) a light source,
      (ii) a plurality of photovoltaic detectors, and
      (iii) a collimating lens,
      said light source and photovoltaic detectors being carried on the inner face of a hollow barrel portion formed in said first housing sub-assembly and said collimating lens being carried proximate the open end of said barrel portion;
   (b) said second housing sub-assembly containing, as another component of said optical means, a plane surface mirror carried on the inner end of a mating barrel portion formed therein, said mating barrel portion being shaped and dimensioned to receive the barrel portion formed in said first housing sub-assembly with an interference fit therebetween to form a unitary structurally integrated device; and
   (c) means for mounting said first and second housing sub-assemblies at spaced points on a structure.

4. An optical sensor adapted for use in the structural information detector of claim 1 comprising:
   (a) an elongate light-transmission member formed of a light-transmitting flexible material and having
      (i) a light-transmitting/receiving end, and
      (ii) a reflecting end;
   (b) a concentrating lens fromed in the reflecting end of said member;
   (c) a light source carried by said light-transmitting-/receiving end of said member positioned to direct light through said member toward said reflecting end;
   (d) light-receiving means carried by said light-transmitting/receiving end of said member for
      (i) receiving light transmitted through said member from said light source to said concentrating lens and reflected thereby through said member to said light-receiving means, and
      (ii) generating electrical signals in response to said received light; and
   (e) means for interconnecting said ends of said member to spaced points on a structure such that bending of said structure causes corresponding bending of said light-transmission member and, in turn, causes a variation in the amount of light received by said light-receiving means.

* * * * *

UNITED STATES PATENT AND TRADEMARK OFFICE
CERTIFICATE OF CORRECTION

PATENT NO. : 4,409,842

DATED : October 18, 1983

INVENTOR(S) : David R. Scott and Thomas S. Rhoades

It is certified that error appears in the above-identified patent and that said Letters Patent is hereby corrected as shown below:

The title page and sheet 1 of the drawings showing Figure 1 should be deleted to appear as per attached title page and sheet 1 of the drawings.

Column 8, line 63, "1/4-150"" should read --1/4-1/8"--.

Signed and Sealed this

Seventeenth Day of April 1984

[SEAL]

Attest:

GERALD J. MOSSINGHOFF

Attesting Officer

Commissioner of Patents and Trademarks

United States Patent

Scott et al.

[11] 4,409,842
[45] Oct. 18, 1983

[54] STRUCTURAL INFORMATION DETECTOR

[75] Inventors: David R. Scott, Lancaster, Calif.; Thomas S. Rhoades, Colorado Springs, Colo.

[73] Assignee: Scott Science & Technology, Inc., Lancaster, Calif.

[21] Appl. No.: 371,321

[22] Filed: Apr. 26, 1982

Related U.S. Application Data

[63] Continuation-in-part of Ser. No. 265,031, May 18, 1981, abandoned, which is a continuation-in-part of Ser. No. 86,772, Oct. 22, 1979, Pat. No. 4,287,511.

[51] Int. Cl.³ ............................................. G01L 1/24
[52] U.S. Cl. ................................... 73/800; 356/34
[58] Field of Search .............. 73/763, 765, 786, 800; 364/508; 356/34

[56] References Cited

U.S. PATENT DOCUMENTS

| | | | |
|---|---|---|---|
| 2,796,503 | 6/1957 | Ward | 73/765 X |
| 3,128,375 | 4/1964 | Grimnes | 364/508 |
| 3,354,703 | 11/1967 | Russell, Jr. et al. | 364/508 X |
| 3,412,961 | 11/1968 | Howard | 364/508 X |
| 3,510,696 | 5/1970 | Bargen et al. | 364/508 X |
| 3,755,658 | 8/1973 | Walters | 364/508 |
| 4,263,810 | 4/1981 | Chiu | 73/800 |

*Primary Examiner*—Jerry W. Myracle
*Attorney, Agent, or Firm*—William H. Drummond

[57] ABSTRACT

A self-contained, unitary device for collecting and interpreting data reflecting the effect of a force acting on a structure includes a housing adapted to be attached at spaced points to the surface of the structure, an optical sensor within the housing for detecting the relative orientation of spaced surface coordinate vectors of the structure, circuitry within the housing for converting signals from the optical sensor to a form usable by signal-processing electronics also located within the housing. The output of this structural information detector embodies useful information which directly indicates the effect of the force acting on the structure.

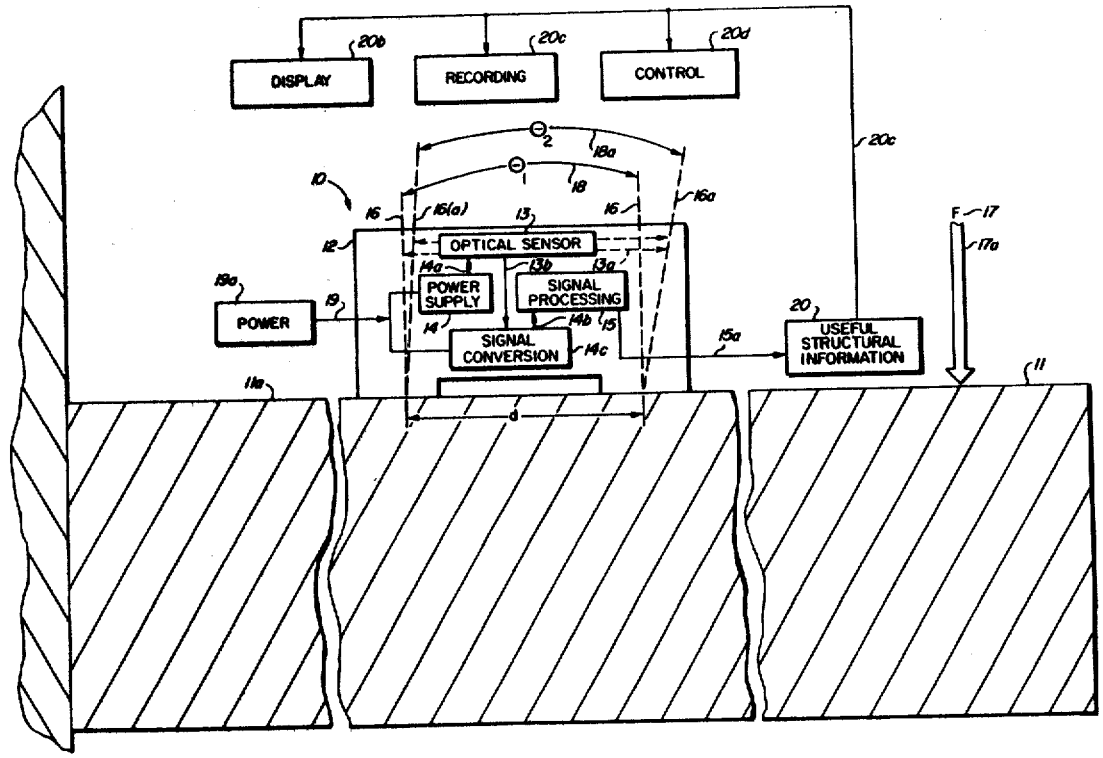

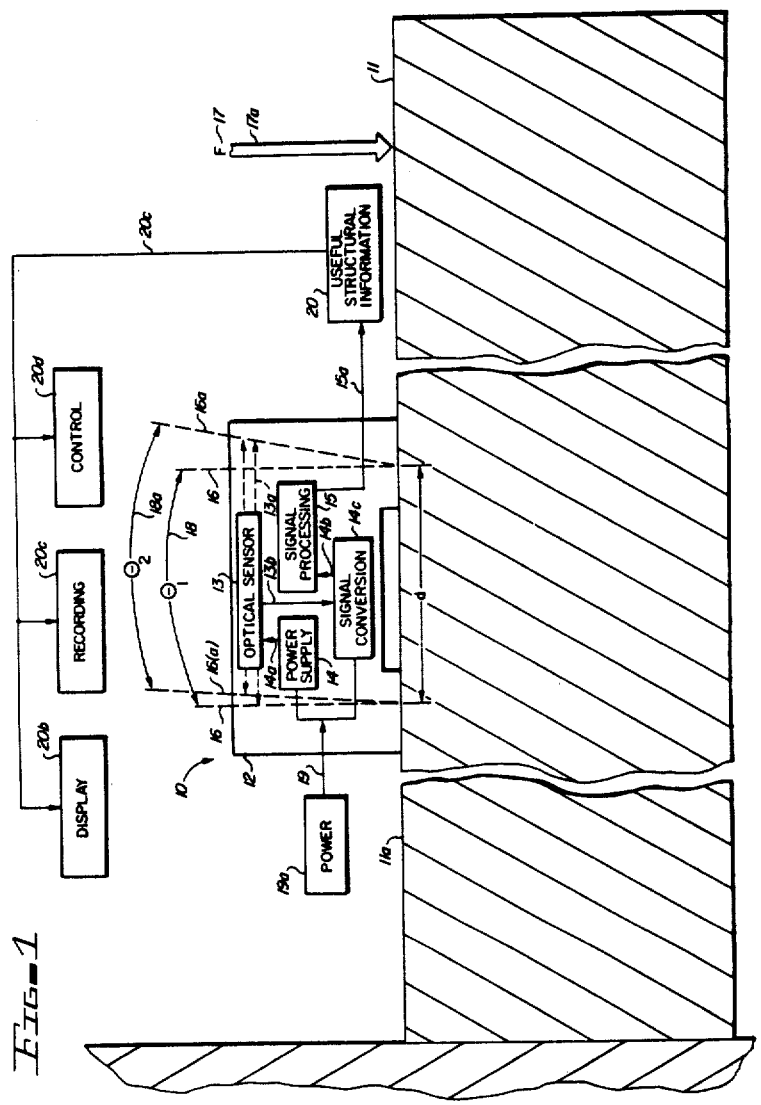

4 Claims, 6 Drawing Figures